W. S. DU CHARME.
PORTABLE PIPE VISE STAND.
APPLICATION FILED APR. 29, 1920.

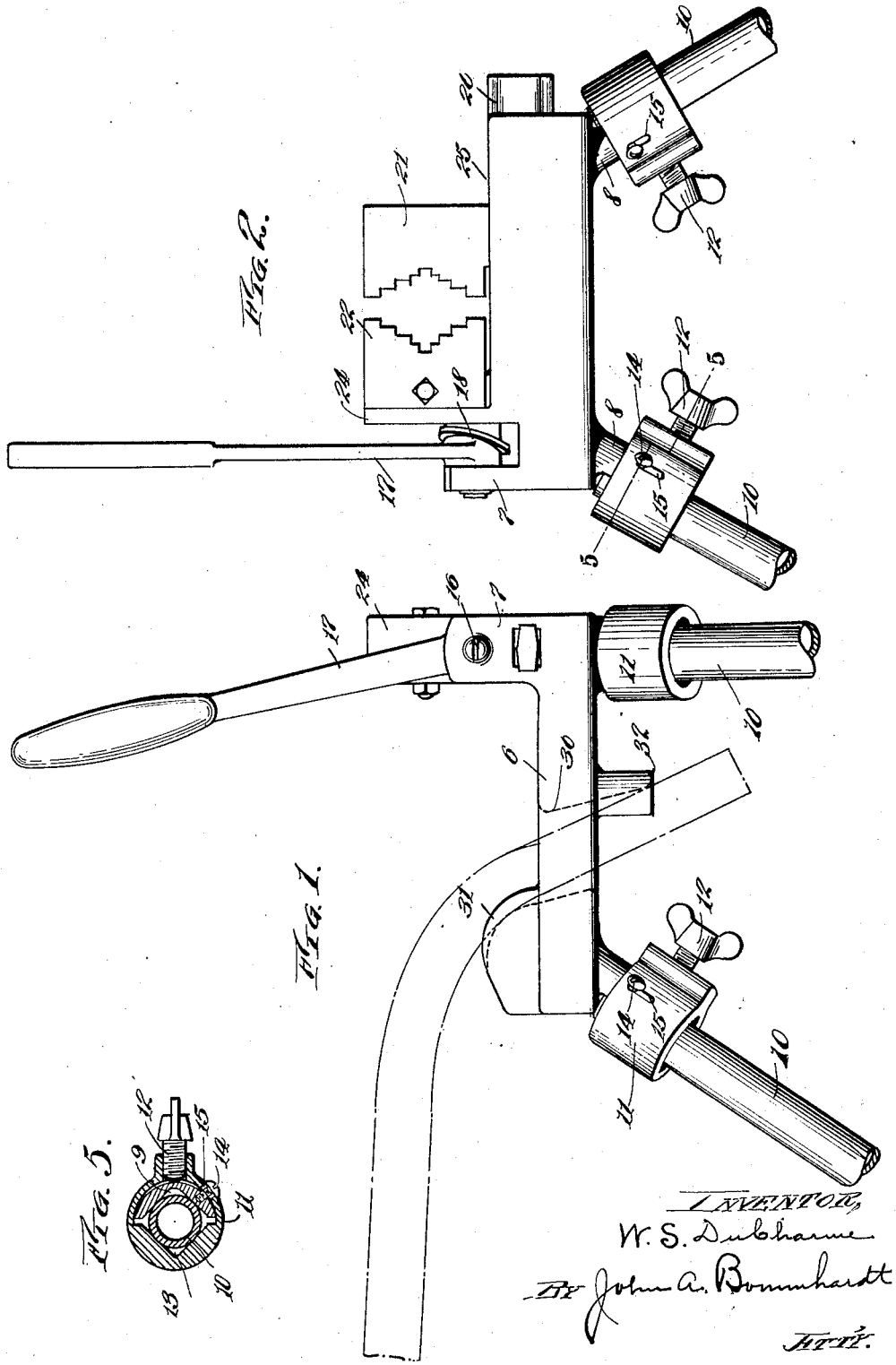

1,393,766.

Patented Oct. 18, 1921.
2 SHEETS—SHEET 2.

INVENTOR,
W. S. DuCharme
BY John A. Bommhardt
ATTY.

ately retaining the clamps against accidental loss.

UNITED STATES PATENT OFFICE.

WILLIAM S. DU CHARME, OF CLEVELAND, OHIO.

PORTABLE PIPE-VISE STAND.

1,393,766.  Specification of Letters Patent.  Patented Oct. 18, 1921.

Application filed April 29, 1920. Serial No. 377,435.

*To all whom it may concern:*

Be it known that I, WILLIAM S. DU CHARME, a citizen of the United States, residing at Cleveland, in the county of Cuyahoga and State of Ohio, have invented certain new and useful Improvements in Portable Pipe-Vise Stands, of which the following is a specification.

This invention relates to portable work stands, and has for its object to provide for an improved device for the use of plumbers, steam fitters and others, which device will support work for various manipulations, the article including a pipe vise and a rod or pipe bender. The construction is such that the legs can be detached and the whole outfit folded into small space for transportation.

Figure 3:
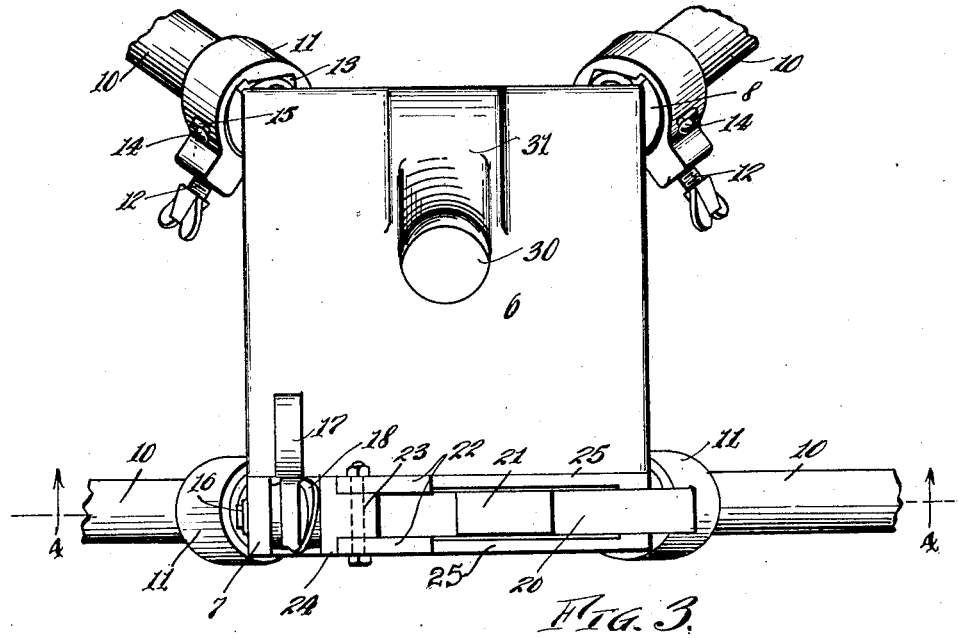
Figure 4:
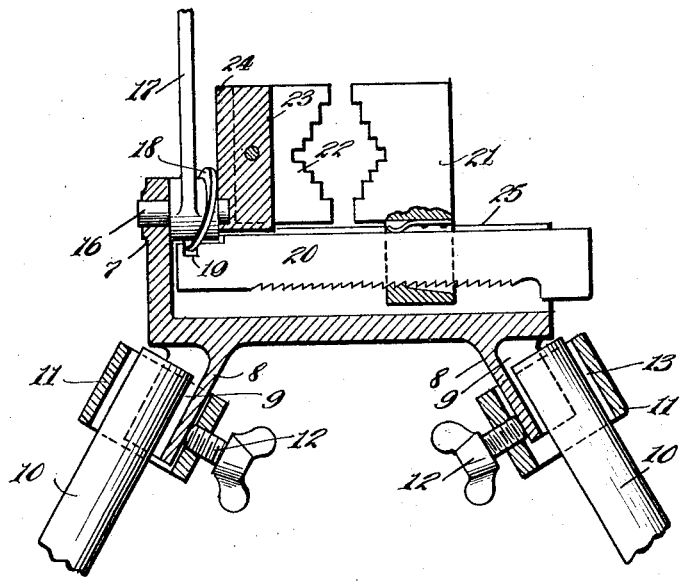

The invention is illustrated in the accompanying drawings in which Figure 1 is a side elevation of the stand. Fig. 2 is an end elevation. Fig. 3 is a plan view. Fig. 4 is a section on the line 4—4 of Fig. 3. Fig. 5 is a detail, in cross section of the leg clamp.

The stand comprises a top or head consisting of a plate 6 which is provided at one end with an upstanding flange 7, and at its four corners with lugs 8 having V-shaped seats 9 to receive the upper ends of the lugs 10 conveniently consisting of pipe sections, the upper ends of which are clamped to the lugs 8 by the ring clamps 11 provided with thumb screws 12 for drawing the clamps against the legs, the engaging faces of the clamps being V-shaped as shown at 13. The clamps are held on the lugs by screws 14 which extend through slots 15, permitting limited vertical movement or looseness, but retaining the clamps against accidental loss.

The flange 7 has a bearing for the pivot 16 of a lever 17 having a cam rib 18 which engages in a notch 19 in a bar 20 carrying the adjustable and movable jaw 21 of a vise, the opposite jaws 22 of which are secured to a block 23 which is integral with or forms a part of flanges 24 projecting upwardly from that edge of the plate 6 adjacent and at right angles to the flange 7, and this flange 24 forming in connection with a parallel flange 25 rising from the plate, a channel in which the bar 20 is slidable. The whole construction forms a vise located at one edge of the stand, and which may conveniently be used for supporting a pipe or rod for work thereon.

The table is provided with a hole 30 at the outer edge of which is a curved or radius block 31 formed on the plate 6, and on the under side of the plate, and at the opposite edge of the hole, is a lug 32. This hole and the adjacent block and lug provide means for bending a pipe or bar, as shown by dotted lines in Fig. 1, the bar being inserted in the hole and then bent by pressure on its outer end. The block 31 also serves as a rest for a pipe or the like held in the vise, said block being located in line with the jaws of the vise.

The device thus comprises a combined work stand, vise and bender and will be found particularly useful for pipe work. By detaching the legs the stand can be collapsed and folded into small compass for carrying.

What I claim as new is:

The combination with a top plate having parallel upstanding flanges 25 thereon, and a cross flange 7 at one end of said flanges, of a bar 20 slidable lengthwise between said flanges 25, an adjustable jaw on said bar, a fixed jaw mounted on one of said flanges 25, between said adjustable jaw and the cross flange, and an operating device pivoted between said fixed jaw and said cross flange and engaging the said bar 20 to shift the same.

In testimony whereof, I do affix my signature in presence of two witnesses.

WILLIAM S. DU CHARME.

Witnesses:
 JOHN A. BOMMHARDT,
 G. W. ROSENBERG.